S. MAY & L. M. ARON.

SOUVENIR MEDALLION.

No. 11,455. Reissued Nov. 27, 1894.

WITNESSES.

Henry Hew

J. A. Lehmann

INVENTORS.

Simon May,

Lessar M. Aron, per Chas. Karp, atty.

UNITED STATES PATENT OFFICE.

SIMON MAY AND LESSAR M. ARON, OF BROOKLYN, ASSIGNORS TO ISRAEL H. HAMBURGER, OF NEW YORK, N. Y.

SOUVENIR MEDALLION.

SPECIFICATION forming part of Reissued Letters Patent No. 11,455, dated November 27, 1894.

Original No. 488,826, dated December 27, 1892. Application for reissue filed June 7, 1894. Serial No. 513,834.

*To all whom it may concern:*

Be it known that we, SIMON MAY and LESSAR M. ARON, of Brooklyn, in the county of Kings and State of New York, have invented certain new and useful Improvements in Souvenir Medallions and Plaques; and we do hereby declare that the following is a full, clear, and exact description of the invention, that will enable others skilled in the art to which it appertains to make and use the same, reference being had to the accompanying drawings, and to the letters of reference marked thereon, which form a part of this specification.

Our invention relates to improvements in medallions and has for its object to provide certain new and useful improvements in the manufacture of medallions showing colored pictures, designs, &c., whereby great artistic effects are produced.

The invention consists of a plate or sheet of transparent material, a picture produced thereon by photography, layers of paint of different colors and scales of pearl applied to the corresponding portions of the said picture, and a suitable covering of paper, or cloth, and metal foil on the layers of paint and scales of pearl, to protect the same against injury.

Reference is to be had to the accompanying drawings, forming a part of this specification, in which similar letters of reference indicate corresponding parts in the several figures.

Figure 1:
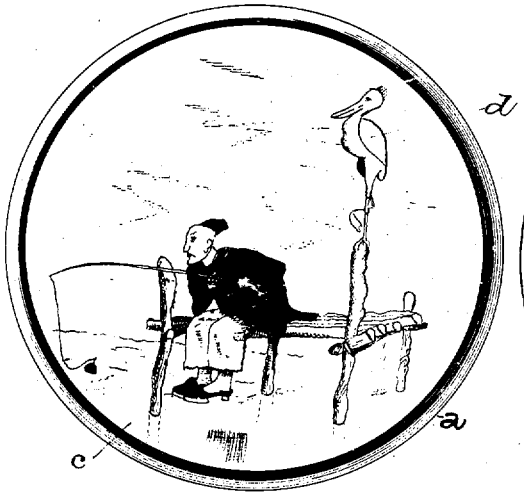
Figure 2:
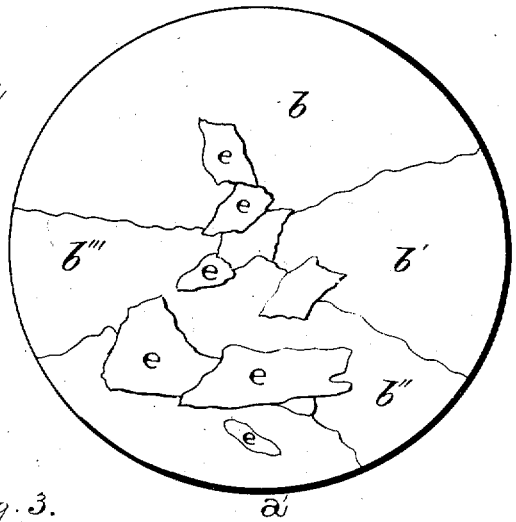
Figure 3:
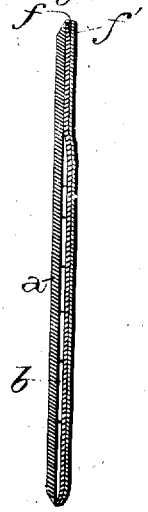

Figure 1 is a front elevation; Fig. 2, a rear elevation, the protecting covering being removed, and Fig. 3, a vertical cross-section of our improved article.

In order to produce the article we employ a plate or sheet *a* of glass, and form on the rear face thereof a picture of any desired character by means of photography made directly upon the said plate or sheet, or on a film applied thereto. Layers *b*, *b'*, *b''*, *b'''*, of paint of different colors are applied to different parts of the rear of the transparent plate or sheet, so that they can be seen through the front-face of the same, and are so relatively located as to give to the picture a tasteful coloring. For example the layer *b* would probably be blue to indicate the sky. The layer *b''* would conveniently be emerald to represent water, and the layers may overlap to give blended colors. Upon the layers *b*, *b'*, *b''*, *b'''*, of different kinds of paint and at various points are located and attached small scales of pearl. For example behind the water, part *c* of the picture, small pieces of pearl are placed, whereby the water is given a beautiful sparkle, so that the water looks real, and even more beautiful than real, because beautifully tinted.

The bird *d* can, if desired, have a piece of pearl placed behind it, which having variegated feathers would appear pearly. The pieces of pearl in Fig. 2 are represented by the letter *e*. They are preferably irregular in shape. The entire back of the thus covered plate or sheet is then covered by a piece of paper or cloth *f*, and may be more protected against injury by a metal foil *f'* applied to such layer or covering piece.

It will be seen that, as the plate *a* consists of a transparent material, the thus decorated picture on the rear of the same appears on the front face, and as the whole picture produced as described is set off by the covered background, a very artistic effect is produced.

Having thus described our invention, we claim as new and desire to secure by Letters Patent—

1. A medallion consisting of a transparent plate, having a picture upon one side, and layers of paint upon the picture, combined with scales of pearl attached to the said side of the medallion, substantially as shown.

2. The combination in a medallion, of the following elements arranged and held together in the order named; a glass plate, a photographic picture, layers of paint, scales of pearl, cloth or paper, and metal foil, substantially as described.

In testimony whereof we affix our signatures in presence of two witnesses.

SIMON MAY.
LESSAR M. ARON.

Witnesses:
JAS. P. MCINERNEY,
AUGUST KRONE.